June 3, 1969  G. K. FARNEY  3,448,330
CROSSED-FIELD REENTRANT STREAM TANDEM SLOW WAVE CIRCUIT TUBE
Filed June 13, 1966  Sheet 1 of 2

INVENTOR.
GEORGE K. FARNEY
BY
*Wm. J. Nolan*
ATTORNEY

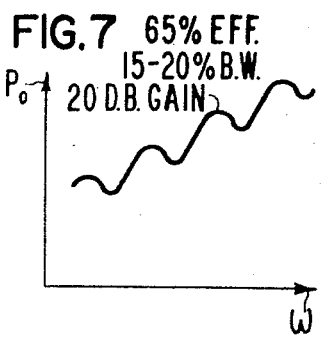
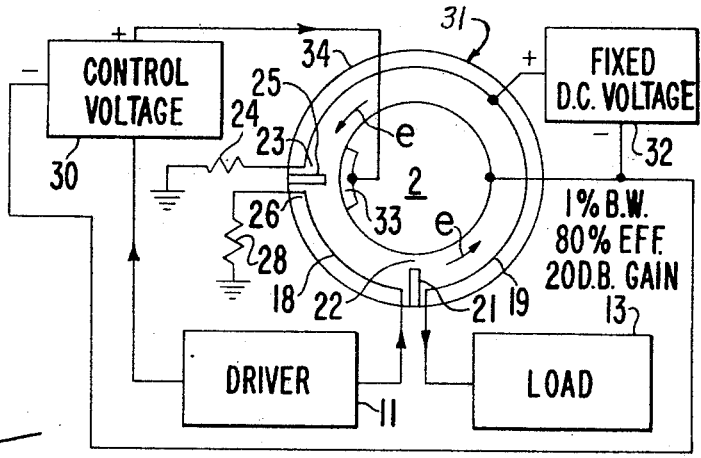
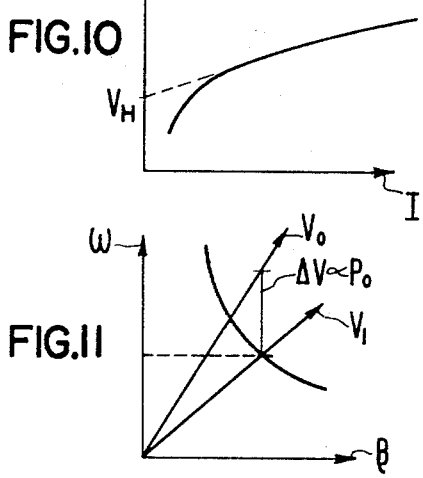
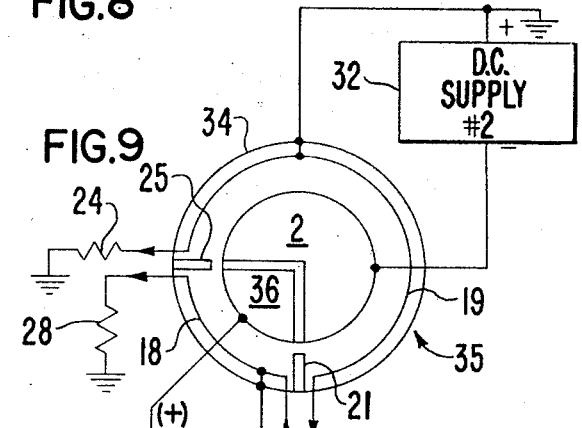
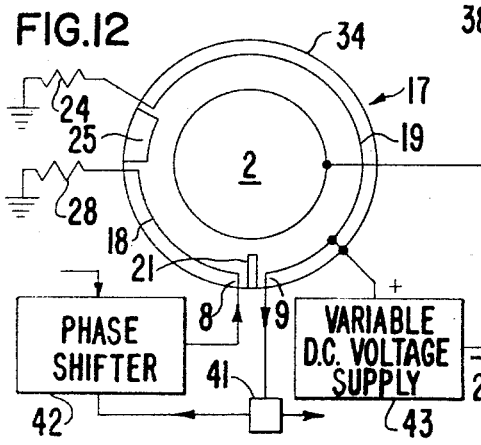
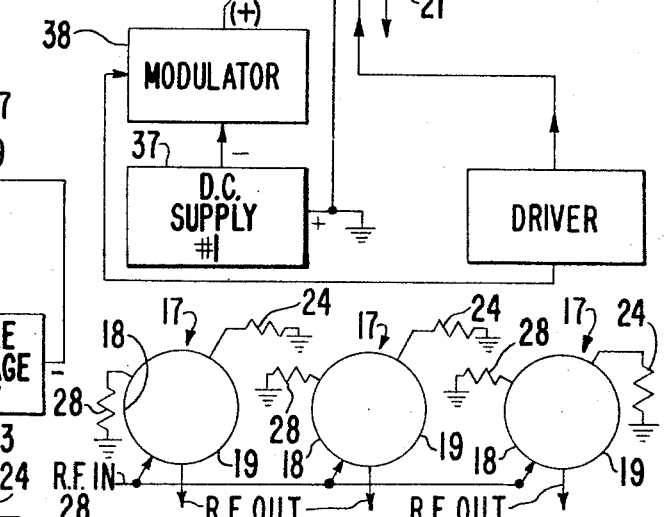
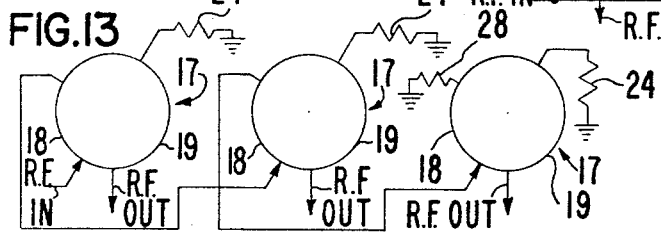
INVENTOR.
GEORGE K. FARNEY
BY
ATTORNEY United States Patent Office 3,448,330
Patented June 3, 1969

3,448,330
CROSSED-FIELD REENTRANT STREAM TANDEM
SLOW WAVE CIRCUIT TUBE
George K. Farney, New Providence, N.J., assignor to
S-F-D Laboratories, Inc., Union, N.J., a corporation of
New Jersey
Filed June 13, 1966, Ser. No. 557,165
Int. Cl. H01j 25/34; H03b 9/08
U.S. Cl. 315—39.3                                   11 Claims

ABSTRACT OF THE DISCLOSURE

A crossed-field reentrant stream tandem slow wave circuit tube is disclosed. The tube includes a cathode electrode structure coaxially disposed and spaced from an anode circuit. The anode circuit includes first and second severed backward slow wave circuits arranged in tandem with respect to an electron stream formed in the region between the coaxially spaced anode and cathode structures. An axially directed magnetic field is provided in the interaction region. The first and second backward slow wave circuits are severed at their ends to define a pair of drift spaces between the adjacent ends of the tow circuits. The first circuit serves as a buncher for bunching the electron stream into spokes of space charge which rotate into interaction with the second slow wave circuit to excite output wave energy on the second circuit. The second circuit sever provided between the downstream end of the output circuit and the upstream end of the buncher circuit is made sufficiently short to permit the bunched electron stream leaving the output circuit to pass into interaction with wave energy on the buncher circuit, thereby providing positive electronic feedback from the output circuit to the input circuit to increase the efficiency of the tube. In certain embodiments of the present invention, the cathode electrode structure is segmented to be operated at independent potentials for improving the efficiency of the tube and/or for operating the tube in a pulsed mode.

---

Figure 1:
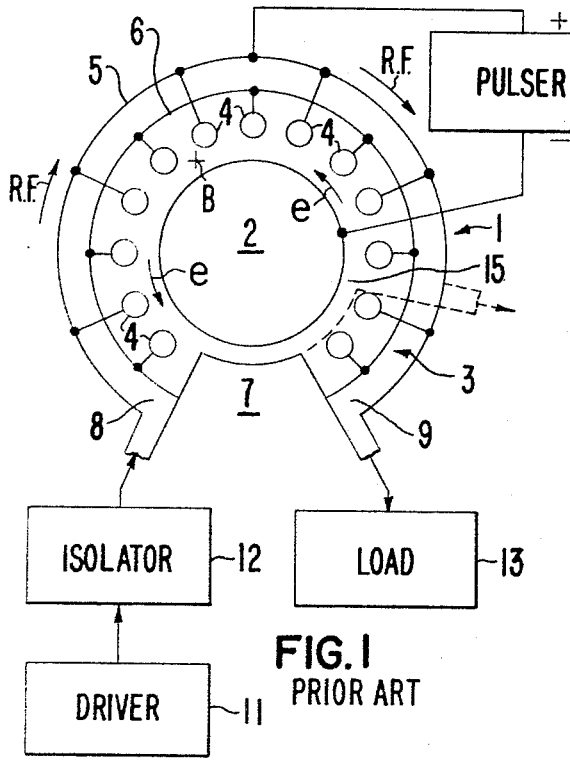

Heretofore, backward wave reentrant stream crossed-field tubes have been employed as microwave amplifiers. However, these prior tubes have required the use of high power isolators for absorbing reflected energy from the load. Such reflected energy would otherwise pass through the tube to the driver producing phase instability of the output and damage of the driver tube. Certain ones of these prior tubes, which have employed positive electronic feedback have provided high efficiency as of 80% but their gain was limited to about 10 db and they were tunable only over bands of less than 10%. Others have provided gain of about 20 db with tunable bands 15 to 20% by eliminating positive electronic feedback, but were limited to efficiencies of less than 60%.

In the present invention, a first backward wave slow wave circuit bunches the electron stream prior to its entry into a second backward wave slow wave circuit. The second slow wave circuit has its low power end terminated in an energy absorptive load, whereby energy reflected from the load connected to the high power end of the output circuit is absorbed without passing through to the driver tube. Thus, the tube of the present invention is self isolating and high power isolators are not required. In fixed tuned tubes of the present invention a high degree of phase stability is obtained with high efficiencies as of 80%.

The principal object of the present invention is the provision of an improved crossed-field tube.

One feature of the present invention is the provision of a self-isolating crossed-field tube employing a reentrant stream of electrons electronically interacting with tandem backward wave slow wave circuits. One of the circuits serves to bunch the electron stream with signal energy and the other circuit being excited by the bunched stream to produce the output signal, whereby the output circuit of the tube is isolated from the input circuit of the tube.

Another feature of the present invention is the same as the preceding feature wherein the electronic drift space between the downstream end of the output circuit and the upstream end of the buncher circuit is sufficiently short to permit the bunched stream to pass into the buncher section of the tube, whereby substantial positive electronic feedback is provided to enhance the efficiency of the tube.

Another feature of the present invention is the same as the preceding feature wherein the cathode electrode of the tube is segmented to form a control electrode portion which is insulated from the remainder of the cathode and wherein the cathode to anode voltage is supplied from a fixed D.C. power supply with the tube being turned off by applying a control potential to the control electrode which is positive relative to potential applied to the other segment of the cathode.

Another feature of the present invention is the same as any one or more of the preceding features wherein the cathode electrode includes two segments which are insulated from each other, one of which is circumferentially coextensive with the buncher circuit and the other of which is coextensive with the output circuit. In this arrangement when the tube is amplifying an input signal, the anode-to-cathode potential is greater in the output section than in the buncher section of the tube, thereby enhancing operating efficiency of the tube.

Another feature of the present invention is the same as any one or more of the preceding features including the provision of means for feeding back a portion of the wave energy of the proper phase from the upstream end of the output circuit to the downstream input end of the buncher circuit to produce an oscillator tube apparatus which is relatively insensitive to reflection of wave energy from its output load.

Another feature of the present invention is the same as any one or more of the preceding features including a plurality of said tubes with their respective buncher circuits being connected in series or parallel and driven from a common source of signal wave energy, whereby the outputs of the tubes all have a predetermined phase relationship.

Figure 2:
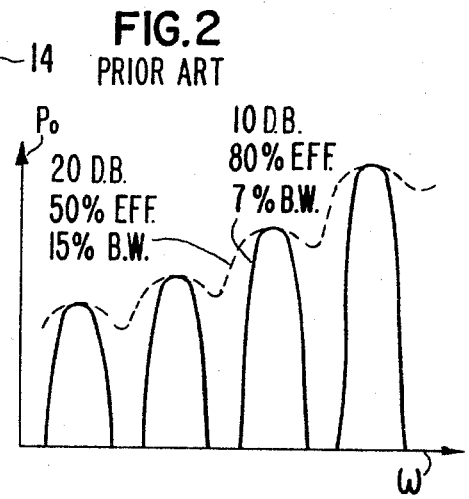
Figure 3:
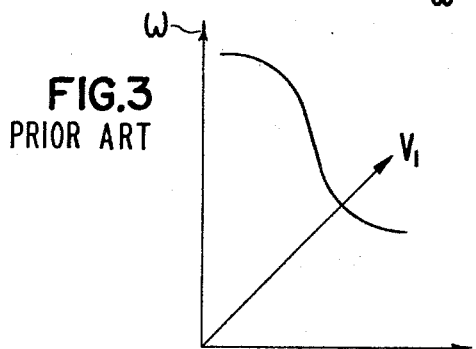
Figure 6:
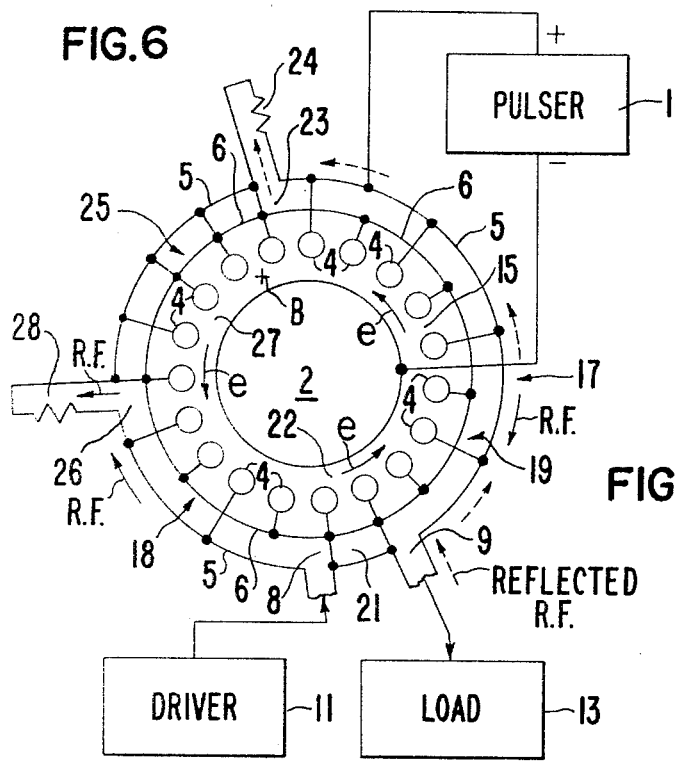
Figure 4:
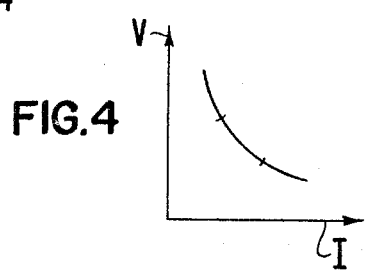
Figure 5:
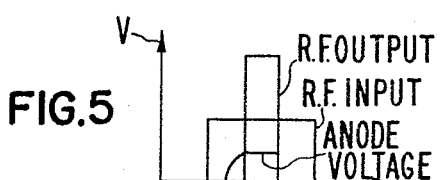

Other features and advantages of the present invention will become apparent upon a perusal of the following specification taken in connection with the accompanying drawings wherein:

FIG. 1 is a schematic diagram, partly in block diagram form, of a prior art crossed-field amplifier tube and circuit, FIG. 2 is a plot of power output $P_0$ versus frequency $\omega$ for the prior art tubes, FIG. 3 is a plot of frequency ω versus phase shift per period B showing the dispersion characteristics for a prior art backward wave slow wave circuit used in the prior tubes of FIG. 1, FIG. 4 is a plot of potential V versus current I for a constant power input as might be supplied to the tube of FIG. 1 by a delay line pulser, FIG. 5 is a plot of voltage V versus time for the microwave input signal, anode-to-cathode potential and microwave output signal depicting pulsed operation of the tube of FIG. 1, FIG. 6 is a schematic line diagram, partly in block diagram form, of a tube and its associated circuitry which employ features of the present invention, FIG. 7 is a plot of power output $P_0$ versus frequency ω for the tube of FIG. 6, FIG. 8 is a schematic line diagram of a narrow band tube and its associated circuitry which employ alternative features of the present invention, FIG. 9 is a schematic line diagram of an alternative tube and circuit embodiment of the present invention, FIG. 10 is a plot of anode to cathode voltage V versus anode to cathode current I for a typical magnetron tube supplied from a D.C. power supply, FIG. 11 is a plot of frequency ω versus phase shift B in radians per period of a backward wave slow wave circuit and depicting the synchronous voltage $V_1$ and the operating voltage $V_0$ for amplification, FIG. 12 is a schematic line diagram of a magnetron oscillator with its associated circuitry forming an alternative embodiment of the present invention, FIG. 13 is a schematic line diagram of a chain amplifier incorporating features of the present invention, and FIG. 14 is a schematic line diagram depicting an alternative embodiment of the circuit of FIG. 13.

Referring now to FIG. 1 there is shown a prior art pulsed crossed-field amplifier tube 1. The tube 1 includes a cylindrical cathode electrode 2 surrounded by a coaxially disposed anode slow wave circuit 3 to define an annular interaction region therebetween which is permeated by an axially directed magnetic field B. The anode circuit 3 and cathode 2 are disposed within an evacuated envelope, not shown.

The anode circuit 3 is a backward wave circuit preferably operating in the fundamental mode and having a dispersion characteristic as shown in FIG. 3. A typical backward wave circuit meeting these criteria is a strapped bar circuit wherein an array of axially directed bars 4 is disposed around the cathode 2 with a pair of circumferentially directed axially spaced straps 5 and 6 being connected to alternate bars intermediate their axial length. The anode circuit 3 is provided with a circuit sever portion 7 separating the microwave input end 8 of the circuit 3 from the output end 9 of the circuit 3.

Microwave signal energy to be amplified by the tube 1 is applied to the input terminal 8 from a source of microwave energy such as a driver tube 11. An isolator 12 is provided in circuit between the driver 11 and the tube 1 to absorb reflected wave energy which is reflected from a load 13 connected to the output end 9 of the tube 1. The isolator 12 is designed to absorb large amounts of reflected energy and may be placed alternatively in circuit between the load 13 and the output terminal 9 of the tube 1.

In operation, a pulse of microwave radio frequency energy as shown in FIG. 5 and as derived from the driver 11 is applied to the tube 1 via isolator 12 and input terminal 8. The applied signal excites the slow wave circuit 3 with R.F. energy. A pulse of beam voltage V as derived from a pulsed delay line supply 14 is applied between the cathode electrode 2, which may be of the secondary emissive type, and the anode circuit 3. When the applied anode-to-cathode voltage rises to a value above the synchronous voltage $V_1$, for the signal frequency, backward wave amplification will take place in the interaction region 15 between the anode 3 and cathode 2. Backward wave interaction means that the R.F. wave is travelling counter to the direction electrons circulate about the cathode 2. As a result of the backward wave interaction the anode to cathode current I will increase limiting the voltage applied to the tube by the delay line pulser 14. The voltage applied to the tube 1 is self-stabilizing in that it will drop with increased current to provide a constant microwave power output during the short interval of the applied anode-to-cathode pulse. The tube is turned off by terminating the pulse of applied anode-to-cathode voltage.

When the circuit sever 7 is circumferentially coextensive with a relatively short section of the cathode, i.e., the electron drift space is short, the electron bunches or spokes, at the input end 8, i.e., downstream end of the anode circuit, may circulate into the upstream end of the anode circuit. The electron stream is thereby prebunched at the signal frequency to provide positive electronic feedback which enhances efficiency of the tube at certain frequencies but narrow the tube at high gain. A typical prior art power output spectrum is shown in FIG. 2. The solid line corresponds to substantial positive electronic feedback as obtained by a short drift space. For a typical tube, 10 db gain at 80% efficiency is obtainable with 7% electronically tunable bandwidth.

The gain of the prior art tubes 1 has heretofore been increased to about 20 db by providing a longer interaction circuit 3, but the bandwidth is thereby substantially reduced to on the order of 1 to 2%. In such higher gain tubes, the bandwidth is restored by increasing the length of the drift space by increasing the length of the circuit severe 7 as shown by the dotted lines of FIG. 1. In such a tube the drift space is increased by an amount sufficient to substantially debunch the reentrant electron stream. For this case the output spectrum appears as shown by the dotted line of FIG. 2 to yield 20 db gain, 15% electronically tunable bandwidth, but only at 50% efficiency. One problem encountered with all the prior art tubes 1 was the requirement for the high power isolator 12 since otherwise wave energy reflected from the load could pass back through the anode circuit 3 of the tube 1 to the driver 11. When used at high power levels this reflected power is very high and can cause catastrophic failure of the drive tube 11.

Referring now to FIG. 6 there is shown a crossed-field microwave amplifier tube 17 of the present invention. The tube 17 is identical to the prior tube 1 of FIG. 1 except that the anode circuit 3 has been separated into two circuits 18 and 19 arranged in tandem with the electron stream in the interaction region 15.

The first backward wave slow wave circuit 18 forms a buncher circuit for interacting with the electron stream to define a buncher section of the tube 17 within which the electron stream is bunched with signal energy. A short circuit sever 21 is provided on the anode circuit between the downstream end 8 of the buncher circuit 18 and the upstream end 9 of the second backward slow wave circuit 19 which forms the output circuit. The circuit sever 21 is conveniently formed by shorting together the bars 4 and straps 5 and 6 at both ends of the severed circuit portion 21. The circuit sever 21 serves to prevent transfer of wave energy along the anode circuit between terminals 8 and 9 and defines an electronic drift region 22 for that portion of the interaction region 15 which is circumferentially coextensive with the circuit sever 21. In the tube of FIG. 6, the circumferential extent of the drift region 22 is made as short as possible and is preferably on the order of one space charge wavelength or less, and always less than 3 space charge wavelengths where a space charge wavelength is equal to the circumferential distance in the interaction region 15 corresponding to 360° of phase shift for wave energy travelling along the slow wave circuit.

The bunched electron stream leaving the buncher section passes into the output circuit section 19. These spoke-like bunches excite the output circuit to induce a backward travelling wave at the input signal frequency on the output circuit 19. This induced wave interacts back on the buncher to produce regenerative backward wave interaction throughout the length of the output circuit 19. The output wave energy is extracted from the output circuit 19 at terminal 9 and fed to a suitable load 13.

The downstream end 23 of the output circuit 19 is terminated in a nonreflective energy absorptive load 24. A second-circuit sever 25 is provided in the anode circuit 3 between the downstream end 23 of the output circuit 19 and an upstream end 26 of the buncher circuit 18. The second sever 25 defines a second electron drift region 27 the circumferential extent of which, for a broadband tube, is preferably sufficiently long to substantially debunch the reentrant electron stream. A drift length of approximately five space charge wavelengths is typically sufficient to reduce the electron bunching to a tolerable level, but should be greater than 3 space charge wavelengths, as aforedefined. The debunching need not be complete as the input microwave signal applied to the buncher circuit 18 at terminal 8 produces a backward travelling wave which refocuses the electron buncher or spokes to provide properly phased spokes or bunches which pass into the output section. An energy absorptive load 28 is connected to the upstream end 26 of the buncher circuit 18 for absorbing the output signal energy on the buncher circuit 18.

There are several advantages to the tube 17 of FIG. 6. One of the advantages is that the tube is self-isolating as regards wave energy reflected from the load 13. Such reflected wave energy is absorbed in the load 24, thereby dispensing with the requirement of a separate high power isolator 12. In addition, as seen from FIG. 7, the tube will provide substantial gain as of 20 db or more over substantial electronically tunable bandwidths as of 15 to 20% with efficiency of about 65%. Moreover, the phase stability of the output is considerably improved as compared to prior tubes as the input terminal 8 is within about one space charge wavelength from the output terminal 9 and the electron spokes generated in the buncher 18 lock the phase of the output signal.

Although, for simplicity of explanation, the tube of FIG. 6 has been depicted and described as using a strapped bar kind of high power fundamental backward wave circuit, other backward wave circuits may be employed such as, for example, a choke supported interdigital line circuit of the type described and claimed in copending U.S. application 350,516 filed Mar. 9, 1964 now issued as U.S. Patent 3,361,926 on Jan. 2, 1968 and assigned to the same assignee as the present invention.

Also the tube 17 of FIG. 6 was described as employing a cold secondary emissive cathode 2 with emission being initiated by applied R.F. and D.C. voltages. The tube 17 is not limited to use of a cold cathode but may also employ a thermionic cathode emitter or an injected beam.

Referring now to FIG. 8 there is shown a narrow band alternative tube 31 and circuit embodiment of the present invention. This embodiment is essentially identical to that of FIG. 6 except that the second circuit sever 25 has been reduced in circumferential extent such as to permit spokes of space charge to pass from the downstream end of the output circuit 19 through to the upstream end of the buncher circuit 18. The drift space 27 in this case would be less than 3 space charge wavelengths in circumferential extent and preferably less than 1 space charge wavelength. This provides substantial positive electronic feedback from the output to the input and enhances the conversion efficiency to on the order of 80% with an attendant reduction in electronically tunable bandwidth to on the order of 1 to 2%, while providing 20 db gain. Since the tube 31 is narrow band it is convenient to provide a fixed anode to cathode voltage derived from a source 32 and to control operation of the tube 32 with a control electrode 33. The control electrode 33 is insulated from the cathode 2 and pulsed to a positive potential relative to the remainder of the cathode 2 for turning off the tube 32 by collecting the circulating electron space charge upon termination of the input microwave R.F. signal. A signal is derived from the output of the driver 11 upon termination of the driver output pulse which signal is fed to a control voltage pulse supply 30 which pulses the control electrode 33 positive relative to the remainder of the cathode 2. Upon termination of the control electrode pulse the control electrode reverts to cathode potential. The provision of the fixed anode to cathode voltage supply 32 reduces the cost of the pulser because the entire anode to cathode power supply need not be pulsed. Only the control electrode 33 need be pulsed which does not require pulsing of substantial amounts of power. The vacuum envelope for the tube 31 is shown at 34.

Referring now to FIG. 9 there is shown an alternative tube and circuit embodiment of the present invention. In this embodiment the tube 35 is essentially identical to that of FIG. 8 except that the cathode electrode 2 is segmented into two insulated segments one of which is circumferentially coextensive with the output circuit 19 and the other 36 of which is circumferentially coextensive with the buncher circuit 18. A first fixed voltage D.C. power supply 32 of the type described in FIG. 8 is connected between the output anode circuit 19 and the adjacent cathode segment 2. A second fixed voltage power supply 37 is connected between the cathode segment 36 and the buncher anode circuit 18. A pulse modulator 38 is connected in circuit between the second power supply 37 and the second cathode segment 36 for pulsing the second segment 36 positive with respect to the remainder of the cathode 2. Thus the pulsed cathode segment 36 collects the circulating electron stream upon termination of the driver pulse of signal energy to be amplified, thereby turning off the tube 35. The provision of the two fixed voltage power supplies 32 and 37 permits the buncher section of the tube 35 to operate at a lower power level than the output section by applying a lower anode-to-cathode operating potential to the buncher section. This is seen by reference to FIG. 10 where the anode-to-cathode current I is increased with increased anode to cathode voltage V above the value of the voltage which establishes synchronous electron velocities in the interaction region, such voltage being the Hartree voltage $V_H$ depicted by the intersection of the dotted line with the ordinate. FIG. 11 also shows a quantity $\Delta V$, which is the amount of applied voltage in excess of synchronous voltage and it indicates that the power output is proportional to this differential voltage $\Delta V$. Thus for efficient high power operation it is desirable to operate the output section of the tube 35 at a potential above that applied to the buncher section.

Referring now to FIG. 12 there is shown a pulsed electronically tunable oscillator tube embodiment of the present invention. In this embodiment the tube 17 is essentially identical to the tube previously described with regard to FIG. 6 except that the cathode electrode 2 is preferably a thermionic emitter and the microwave R.F. input signal for the tube is derived from the output of the tube 17 via a directional power splitter 41. The power splitter 41 splits off a small fraction of the output signal and feeds it into the input port 8 of the buncher circuit 18. An electrically variable phase shifter 42 such as a ferrite phase shifter shifts the phase of the output signal in response to an input phase shift signal to provide regenerative positive R.F. feedback to the buncher section which in turn controls the phase of the output via control of the phase of the space charge spokes passing into the output section. The relatively short R.F. path length from the output 9 to the input 8 permits the oscillator of FIG. 12 to be electronically tuned via the input signal to the phase shifter 42 over a broadband of frequencies by varying the phase shift of the wave energy passing through the phase shifter 42.

Referring now to FIG. 13 there is shown a chain amplifier circuit employing features of the present invention. In this embodiment a plurality of amplifier tubes 17, as described with regard to FIG. 6, are connected to an input driver 11, not shown, with the buncher circuits of all of the tubes 17 connected in series. In this manner the R.F. output of the first buncher circuit is fed to the input of the next tube and so on and so forth. The respective outputs of the various tubes, so connected, will have a predetermined and controlled phase relationship relative to that of the driver signal. Alternatively, the chain of tubes 17 may be connected with the successive buncher circuits connected in parallel to the output of the driver 11, as shown in FIG. 14, to produce the controlled output phase.

In a typical example of a tube 17 of the present invention operating at 9 gHz. the buncher circuit 18 included 15 periodic elements, the output circuit included 30 to 40 periodic elements, anode-to-cathode voltage was 40 kv., the first drift space 22 was equal in circumferential extent to 2 periods of the slow wave circuit, and the second drift space 27 was equal to 10 periods of the slow wave circuit. Such a tube will exhibit 20 db gain with 1 megawatt peak power output.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a crossed-field reentrant stream tube apparatus, means forming a cathode electrode, means forming an anode electrode coaxially disposed of and spaced from said cathode electrode to define an annular electron stream region in the space therebetween which in the presence of an axially directed magnetic field passing through the annular region causes the electron stream in the annular region to circulate around the cathode electrode in a certain predetermined circumferential direction and in a reentrant manner, means forming a pair of backward wave slow wave circuits extending in the circumferential direction and disposed adjacent the reentrant electron stream for cumulative electronic interaction between the electrons of the stream and wave energy on said pair of circuits traveling in a direction counter to the direction of the electron stream, one of said backward wave circuit means serving to bunch the electron stream with signal energy to be amplified by the other one of said circuit means which defines an output circuit, the downstream end of said buncher circuit means being disposed in sufficiently close relation to the upstream end of said output circuit means such that the bunched electron stream leaving said buncher circuit means carries the electron bunches into interaction with said output circuit means to excite the output signal on said output circuit means, whereby said buncher circuit is isolated from said output circuit means for wave energy deflected from a load connected to the upstream end of said output circuit means, the improvement comprising, means forming a sufficiently short electronic drift space between the downstream end of said output circuit means and the upstream end of said buncher circuit means to permit the bunched electron stream leaving the output circuit means to pass into interaction with wave energy on said buncher circuit, thereby providing positive electronic feedback from said output circuit to said input circuit to increase the efficiency of the tube apparatus.

2. The apparatus according to claim 1 wherein said cathode electrode is of the cold secondary emissive type with emission being initiated by the combined action of the microwave energy on the adjacent slow wave circuit and the anode to cathode voltage in the presence of an axial magnetic field.

3. The apparatus of claim 1 including, means for feeding back a portion of the output wave energy from the output end of said output circuit means to the input end of said buncher circuit means of the correct phase to produce an oscillator tube which is electronically tunable over a substantial bandwidth by changing the phase of the feedback wave energy.

4. A plurality of the tube apparatuses of claim 1 including, means forming a common source of signal wave energy to be amplified, and wherein said plurality of buncher circuits are connected to and driven by signal wave energy derived from said common source, whereby the output signals derived from said plurality of tube apparatuses are all caused to have a predetermined phase relationship relative to each other.

5. The apparatus of claim 4 wherein said plurality of separate buncher circuit means are all connected in series to said common source of signal wave energy.

6. The apparatus of claim 5 wherein said plurality of separate buncher circuit means are all connected in parallel to said common source of signal wave energy.

7. The apparatus of claim 1 including a wave energy absorptive load connected to the downstream end of said output circuit means for dissipating wave energy reflected onto said circuit means from the output load of the tube apparatus.

8. The apparatus of claim 7 including a wave energy absorptive load connected to the upstream end of said buncher circuit means for absorbing signal wave energy on said circuit in excess of that required for bunching of the electron stream.

9. The apparatus of claim 1 including means for applying a fixed D.C. potential between said anode and cathode electrodes, and means forming a control electrode disposed adjacent the electron stream for controlling operation of the tube apparatus by having an operating potential applied thereto which operating potential is different than the fixed anode-to-cathode potential.

10. A crossed field reentrant stream tube apparatus including, means forming a cathode electrode, means forming an anode electrode coaxially disposed of and spaced from said cathode electrode to define an annular electron stream region in the space therebetween which in the presence of an axially directed magnetic field passing through the annular region causes the electron stream in the annular region to circulate around the cathode electrode in a certain predetermined circumferential direction and in a reentrant manner, means forming a pair of backward wave slow wave circuits extending in the circumferential direction and disposed adjacent the reentrant electron stream for cumulative electronic interaction between the electrons of the stream and wave energy on said pair of circuits traveling in a direction counter to the direction of the electron stream, one of said backward wave circuit means serving to bunch the electron stream with signal energy to be amplified by the other one of said circuit means which defines an output circuit, the downstream end of said buncher circuit means being disposed in sufficiently close relation to the upstream end of said output circuit means such that the bunched electron stream leaving said buncher circuit carries the electron buncher into interaction with said output circuit means to excite the output signal on said output circuit means, whereby said buncher circuit is isolated from said output circuit means for wave energy reflected from a load connected to the upstream end of said output circuit means, the improvement wherein, said cathode electrode includes at least two insulated segments each occupying separate circumferential extents of said cathode electrode means, one of said cathode segments serving as a control electrode for controlling the output of the tube.

11. The apparatus of claim 10 wherein one of said cathode segments is circumferentially coextensive with said output circuit means and the other cathode segment is circumferentially coextensive with said buncher circuit means, whereby in operation the anode-to-cathode potential applied to the buncher section of the tube may be less than the anode-to-cathode potential applied to the output section of the tube for enhanced efficiency of the tube.

References Cited

UNITED STATES PATENTS

| | | | |
|---|---|---|---|
| 2,956,204 | 10/1960 | Dohler et al. | 315—39.3 |
| 3,082,351 | 3/1963 | Okress | 315—39.3 |
| 3,123,735 | 3/1964 | Hull | 315—3.6 |

FOREIGN PATENTS 976,675  12/1964  Great Britain.

HERMAN K. SAALBACH, *Primary Examiner.*

SAXFIELD CHATMON, JR., *Assistant Examiner.*

U.S. Cl. X.R.

315—3.6; 330—43; 331—82